(12) United States Patent
Prasad et al.

(10) Patent No.: US 9,094,696 B2
(45) Date of Patent: Jul. 28, 2015

(54) SYSTEM AND METHOD TO ENSURE BUFFER COMPLIANCE IN A MPEG2 TRANSPORT STREAM SYSTEM

(75) Inventors: Vikas K. Prasad, Bangalore (IN); Karthikeyan Natesan, Tamilnadu (IN); Battula Kishor Babu, Andhra Pradesh (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 450 days.

(21) Appl. No.: 13/366,378

(22) Filed: Feb. 6, 2012

(65) Prior Publication Data

US 2013/0201396 A1     Aug. 8, 2013

(51) Int. Cl.
*H04N 21/242* (2011.01)
*H04N 21/236* (2011.01)

(52) U.S. Cl.
CPC .......... *H04N 21/236* (2013.01); *H04N 21/242* (2013.01)

(58) Field of Classification Search
CPC .......... H04N 7/04; H04N 7/08; H04N 5/602; H04N 5/9208; G11B 27/031
USPC ........................................................ 348/469
See application file for complete search history.

(56) References Cited

U.S. PATENT DOCUMENTS

| 6,775,257 | B1* | 8/2004 | Watanabe ...................... 370/335 |
| 2001/0026561 | A1* | 10/2001 | Morris et al. ................. 370/487 |
| 2007/0076764 | A1* | 4/2007 | Kawada et al. ............... 370/503 |
| 2008/0187055 | A1* | 8/2008 | Haase et al. .................. 375/241 |
| 2012/0147954 | A1* | 6/2012 | Kasai et al. .............. 375/240.03 |

* cited by examiner

*Primary Examiner* — Dave Czekaj
*Assistant Examiner* — Berteau Joisil
(74) *Attorney, Agent, or Firm* — Prakash Nama; Global IP Services, PLLC (57) ABSTRACT

A system and method for ensuring buffer compliance in a moving picture experts group 2 (MPEG2) transport stream (TS) system is disclosed. In one embodiment, a plurality of encoded audio/video (A/V) streams is categorized into a first group and a second group. Further, interleaving bits and a number of bytes to be sent are computed for each encoded A/V stream in the first group and the second group, respectively. Furthermore, an encoded A/V stream is selected based on the computed interleaving bits and number of bytes to be sent, respectively. In addition, one or more TS packets are generated by packetizing data in one or more frames in the selected encoded A/V stream based on program clock reference (PCR) and decode time stamp (DTS) associated with the one or more frames to ensure buffer compliance in the MPEG2 TS system.

31 Claims, 7 Drawing Sheets

SYSTEM AND METHOD TO ENSURE BUFFER COMPLIANCE IN A MPEG2 TRANSPORT STREAM SYSTEM

FIELD OF TECHNOLOGY

The present invention relates in general to a moving picture experts group 2 (MPEG2) transport stream (TS) system and more particularly, to ensuring buffer compliance in the MPEG2 TS system.

BACKGROUND

Moving picture experts group 2 (MPEG2) is a standard for generic coding of audio/video (NV) streams. Typically, an MPEG2 transport stream (TS) multiplexing module, in a MPEG2 TS system, multiplexes encoded A/V streams by interleaving the encoded A/V streams. Further, the MPEG2 TS multiplexing module packetizes and sends the interleaved encoded A/V streams in the form of TS packets to a plurality of set-top boxes and/or digital television (TVs) at different subscriber locations. Furthermore, the TS packets are buffered in decoder buffers, such as a transport buffer and a main buffer residing in the set-top boxes and/or digital TVs. In addition, the buffered TS packets are decoded and then output, at predetermined timings, to TVs connected to the set-top boxes and/or to the digital TVs.

Typically, the MPEG2 TS multiplexing module is implemented in hardware. However, the hardware implementation of the MPEG2 TS multiplexing module is targeted for a specific application domain (e.g., broadcasting, transcoding, and streaming server), a specific digital TV standard (e.g., digital video broadcasting (DVB), advanced television systems committee (ATSC)) and is not scalable to support additional features. Therefore, the hardware implementation of the MPEG2 TS multiplexing module reduces reusability across multiple application domains and multiple digital TV standards. To solve these problems, the MPEG2 TS multiplexing module is implemented in software.

Typically, the software implementation of the MPEG2 TS multiplexing module is customizable, extensible and caters to the multiple application domains and the multiple digital TV standards. The software implementation of the MPEG2 TS multiplexing module multiplexes the encoded A/V streams by interleaving the encoded A/V streams based on a timestamp associated with each of the encoded A/V streams. However, interleaving the encoded A/V streams based on the timestamp may not prevent overflow/underflow conditions of the decoder buffers. One existing approach to prevent overflow/underflow conditions of the decoder buffers is to use a feedback mechanism between the MPEG2 TS multiplexing module and a plurality of encoders in the MPEG2 TS system. However, this approach may increase complexity of the MPEG2 TS system.

Also, in the software implementation of the MPEG2 TS multiplexing module, generally, a program clock reference (PCR) of the MPEG2 TS system is set based on a system time clock (STC) of the MPEG2 TS system. However, using this approach, the PCR may not be set accurately due to an inherent delay in retrieving the STC using drivers in the MPEG2 TS system.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method of ensuring buffer compliance in a moving picture experts group 2 (MPEG2) transport stream (TS) system are disclosed. In the following detailed description of the embodiments of the invention, references are made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
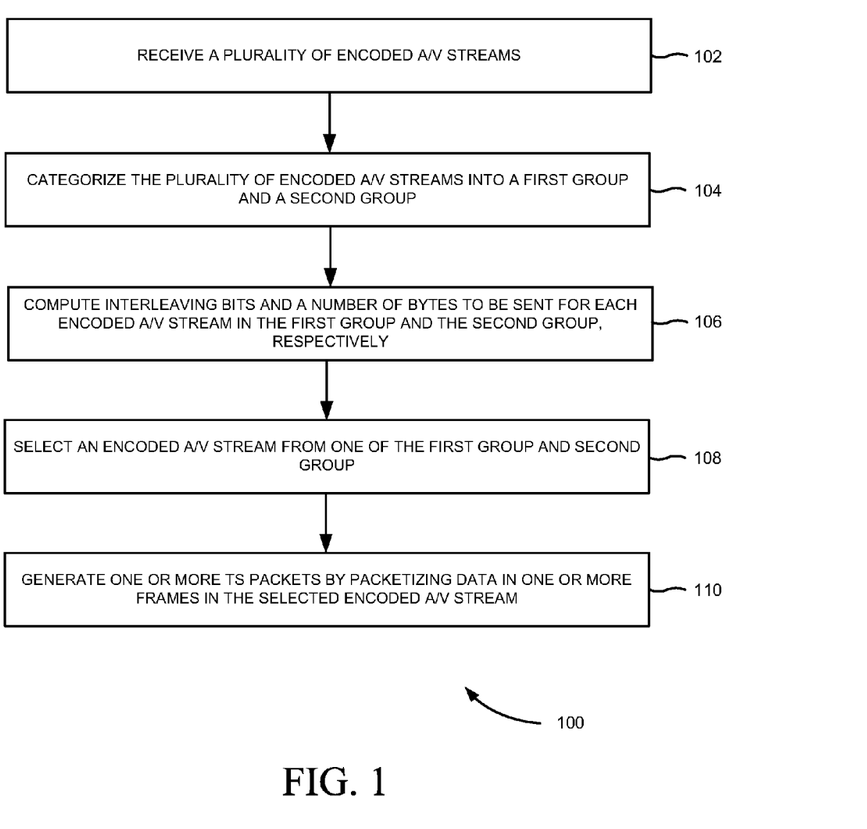
FIG. 1 illustrates a flow chart of an exemplary method of ensuring buffer compliance in a moving picture experts group 2 (MPEG2) transport stream (TS) system.

FIG. 1 illustrates a flow chart 100 of an exemplary method of ensuring buffer compliance in a MPEG2 TS system. At block 102, a plurality of encoded audio/video (A/V) streams is received from a plurality of encoders in the MPEG2 TS system. At block 104, the plurality of encoded A/V streams is categorized into a first group and a second group. In one embodiment, the plurality of encoded A/V streams is categorized based on a TS bit rate of the MPEG2 TS system and a buffer drain rate of the plurality of encoded A/V streams. Exemplary buffer includes a transport buffer for audio and a transport buffer for video. This is explained in more detail with reference to FIG. 2. For example, the TS bit rate of the MPEG2 TS system is computed based on bit rates of the received encoded A/V streams.

At block 106, interleaving bits and a number of bytes to be sent are computed for each encoded A/V stream in the first group and the second group, respectively. In one embodiment, the interleaving bits are computed for each encoded A/V stream in the first group based on the TS bit rate of the MPEG2 TS system and a bit rate associated with each encoded A/V stream in the first group. Further in this embodiment, the number of bytes to be sent, in a predefined time interval, from each encoded A/V stream in the second group is computed based on a bit rate associated with each encoded A/V stream in the second group. This is explained in more detail with reference to FIG. 2.

At block 108, an encoded A/V stream is selected from one of the first group and second group based on the computed interleaving bits and number of bytes to be sent, respectively. This is explained in more detail with reference to FIGS. 3 and 4. At block 110, one or more TS packets are generated by packetizing data in one or more frames in the selected encoded A/V stream based on program clock reference (PCR) and decode time stamp (DTS) associated with the one or more frames to ensure buffer compliance in the MPEG2 TS system. In one embodiment, it is determined whether the selected encoded A/V stream is from the first group. If it is determined that the selected encoded A/V stream is from the first group then a TS packet is generated by packetizing data in the selected encoded A/V stream and the interleaving bits is recomputed for the selected encoded A/V stream. This is explained in more detail with reference to FIG. 3. If it is determined that the selected encoded A/V stream is not from the first group then the TS packet is generated by packetizing data in the selected encoded A/V stream based on the computed number of bytes to be sent. This is explained in more detail with reference to FIG. 4

In one embodiment, to generate the TS packet by packetizing the data in the selected encoded A/V stream, it is determined whether the data to be packetized includes a new frame. If it is determined that the data includes the new frame then a PCR of the MPEG2 TS system is computed. For example, the PCR is computed based on the TS bit rate of the MPEG2 TS system.

Further in this embodiment, the computed PCR and a DTS associated with the new frame are compared. Furthermore, based on the comparison, the TS packet is generated by packetizing the data. This is explained in detail with reference to FIG. 5. In addition in this embodiment, the computed PCR and a system time clock (STC) are compared. Also in this embodiment, based on the comparison, a correction factor is added to the PCR. This is explained in detail with reference to FIG. 6.

Moreover in this embodiment, if it is determined that the data to be packetized does not include a new frame, the TS packet is generated by packetizing the data. Further, the step of selecting an encoded A/V stream from one of the first group and second group is repeated based on the recomputed interleaving bits and the computed number of bytes to be sent, respectively. This is explained in detail with reference to FIG. 5.

Figure 2:
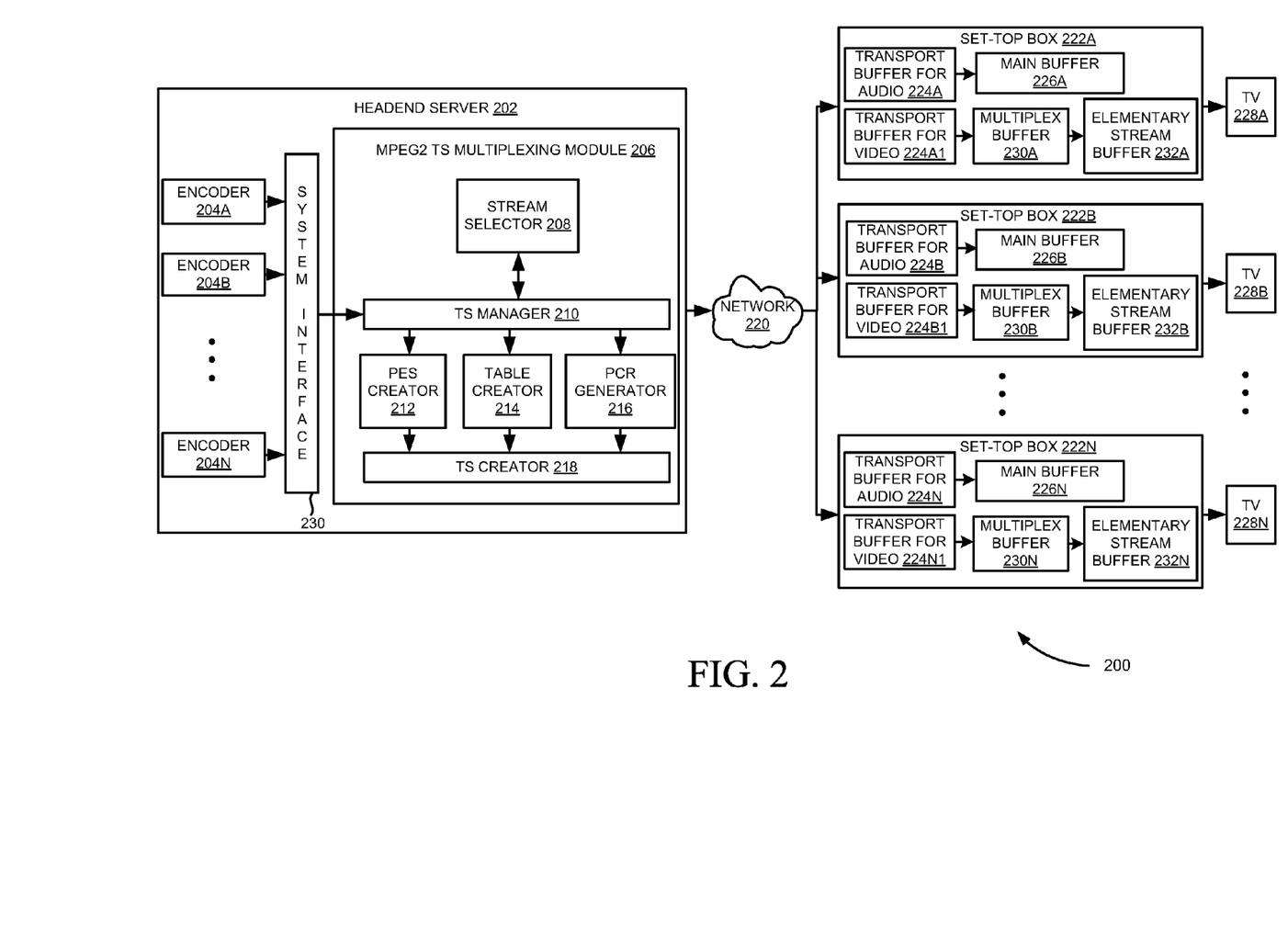
FIG. 2 illustrates the MPEG2 TS system for ensuring buffer compliance, using the process described with reference to FIG. 1, according to one embodiment.

Referring now to FIG. 2, which illustrates a MPEG2 TS system 200 for ensuring buffer compliance, using the process described with reference to FIG. 1, according to one embodiment. As shown in FIG. 2, the MPEG2 TS system 200 includes a headend server 202, a plurality of set-top boxes 222A-N and a plurality of televisions (TVs) 228A-N. Further as shown in FIG. 2, the headend server 202 includes a plurality of encoders 204A-N, a system interface 230 and a MPEG2 TS multiplexing module 206. Furthermore as shown in FIG. 2, the MPEG2 TS multiplexing module 206 includes a stream selector 208, a TS manager 210, a packetized elementary stream (PES) creator 212, a table creator 214, a PCR generator 216 and a TS creator 218. Exemplary encoders include audio encoders and video encoders. In addition as shown in FIG. 2, each of the set-top boxes 222A-N includes an associated one of a plurality of transport buffers for audio 224A-N, an associated one of a plurality of transport buffers for video 224A1-N1, an associated one of a plurality of main buffers 226A-N, an associated one of a plurality of multiplex buffers 230A-N and an associated one of a plurality of elementary stream buffers 232A-N.

Further as shown in FIG. 2, the headend server 202 is coupled to the set-top boxes 222A-N via a network 220. Exemplary network includes a cable television (TV) network, a satellite TV network, a terrestrial network, an Internet protocol (IP) network, a wireless local area network (WLAN) and the like. Furthermore, each of the set-top boxes 222A-N is coupled to an associated one of the TVs 228A-N. In addition, the encoders 204A-N are coupled to the MPEG2 TS multiplexing module 206 via the system interface 230. Moreover, the stream selector 208 is coupled to the TS manager 210. Also, the PES creator 212, the table creator 214 and the PCR creator 216 are coupled between the TS manager 210 and the TS creator 218. In addition, each of the transport buffers for audio 224A-N is coupled to an associated one of the main buffers 226A-N. Also, each of the transport buffers for video 224A1-N1 is coupled to an associated one of the multiplex buffers 230A-N. Moreover, each of the multiplex buffers 230A-N is coupled to an associated one of the elementary stream buffers 232A-N.

In operation, the MPEG2 TS multiplexing module 206 receives a plurality of encoded A/V streams from the encoders 204A-N via the system interface 230. Particularly, the TS manager 210 in the MPEG2 TS multiplexing module 206 receives the encoded A/V streams. Further in operation, the TS manager 210 sends the encoded A/V streams to the stream selector 208. Furthermore in operation, to avoid an overflow condition of the transport buffers for audio 224A-N and the transport buffers for video 224A1-N1 in the set-top boxes 222A-N, the stream selector 208 categorizes the encoded A/V streams into a first group and a second group. In one embodiment, the stream selector 208 categorizes the encoded A/V streams based on a TS bit rate of the MPEG2 TS system 200 and a buffer drain rate of the encoded A/V streams. In this embodiment, the buffer drain rate includes the drain rate of the transport buffers for audio 224A-N and the transport buffers for video 224A1-N. For example, if the buffer drain rate of an encoded A/V stream is less than the TS bit rate of the MPEG2 TS system 200 then the encoded A/V stream is placed in the first group, else the encoded A/V stream is placed in the second group.

In addition in operation, the stream selector 208 computes interleaving bits and a number of bytes to be sent for each encoded A/V stream in the first group and the second group, respectively. In one embodiment, the stream selector 208 computes interleaving bits for each encoded A/V stream in the first group based on the TS bit rate of the MPEG2 TS system and a bit rate associated with each encoded A/V stream in the first group. The interleaving bits for an $i^{th}$ encoded A/V stream in the first group is computed using an equation:

$$\text{interleaving\_bits}_i = ((BR_{ts} - BR_i)/BR_i)*(188*8) \quad (1)$$

where interleaving_bits$_i$ is a number of bits that have to be sent, from encoded A/V streams other than the $i^{th}$ encoded A/V stream, between two TS packets of the $i^{th}$ encoded A/V stream, $BR_{ts}$ is the TS bit rate of the MPEG2 TS system 200 and $BR_i$ is a bit rate of the $i^{th}$ encoded A/V stream in the first group.

Further in this embodiment, the stream selector 208 computes the number of bytes to be sent, in a predetermined time interval, from each encoded A/V stream in the second group based on a bit rate associated with each encoded A/V stream in the second group. The predetermined time interval is also referred to as a constant bit rate (CBR) interval. The number of bytes to be sent, in the CBR interval, from a $j^{th}$ encoded A/V stream in the second group is computed using an equation:

$$\text{cbr\_num\_bytes}_j = BR_j * \text{cbr\_int} \quad (2)$$

where cbr_num_bytes$_j$ is the number of bytes to be sent, in the CBR interval, from the j$^{th}$ encoded A/V stream in the second group, BR$_j$ is a bit rate of the j$^{th}$ encoded A/V stream in the second group and cbr_int is the CBR interval.

Moreover in operation, the stream selector 208 selects an encoded A/V stream from one of the first group and second group based on the computed interleaving bits and the number of bytes to be sent, respectively. This is explained in more detail with reference to FIGS. 3 and 4. Also in operation, the stream selector 208 sends the selected encoded A/V stream to the TS manager 210. The TS manager 210 then instructs the PES creator 212 and the TS creator 218 to packetize data in the selected encoded A/V stream. In one embodiment, if the selected encoded A/V stream is from the first group then the TS creator 218 generates a TS packet by packetizing data in the selected encoded A/V stream. The stream selector 208 then recomputes interleaving bits for the selected encoded A/V stream using the equation (1). This is explained in more detail with reference to FIG. 3. Further in this embodiment, if the selected encoded A/V stream is from the second group then the TS creator 218 generates the TS packet by packetizing data in the selected encoded A/V stream based on the computed number of bytes to be sent. In some embodiments, based on the computed number of bytes to be sent, the TS creator 218 generates one or more TS packets by packetizing data in one or more frames in the selected encoded A/V stream. Furthermore in this embodiment, the stream selector 208 repeats the step of selecting an encoded A/V stream from one of the first group and second group using the recomputed interleaving bits and the number of bytes to be sent, respectively. This is explained in more detail with reference to FIG. 5.

In one embodiment, to generate the TS packet by packetizing data in the selected encoded A/V stream, the TS manager 210 determines whether the data to be packetized includes a new frame. If the data does not include a new frame then the TS manager 210 instructs the TS creator 218 to generate the TS packet by packetizing the data. If the data includes a new frame then the TS manager 210 instructs the PCR generator 216 to compute a PCR of the MPEG2 TS system. Further, the TS manager 210 instructs the TS creator 218 to compare the PCR and a DTS associated with the new frame. Based on the comparison, the TS creator 218 generates the TS packet by packetizing the data in the selected encoded A/V stream. This avoids overflow and underflow conditions of the main buffers 226A-N if the selected encoded A/V stream is an audio stream and avoids overflow condition of the multiplex buffers 230A-N and an underflow condition of the elementary stream buffers 232A-N if the selected encoded NV stream is a video stream. This is explained in more detail with reference to FIG. 5.

In another embodiment, the TS manager 210 ensures that the PCR generator 216 computes the PCR of the MPEG2 TS system at predetermined time intervals and the TS creator 218 sends the computed PCR along with the TS packets generated at the predetermined time intervals. A number of bits after which PCR is sent along with a TS packet is computed using an equation:

$$PCR_{bits}=BR_{ts}*PCR_{intvl} \qquad (3)$$

where PCR$_{bits}$ is the number of bits after which the PCR is sent along with the TS packet, BR$_{ts}$ is the TS bit rate of the MPEG2 TS system 200 and PCR$_{intvl}$ is the predetermined time interval.

Further in this embodiment, an approximate number of TS packets after which the PCR is sent along with a TS packet is computed using an equation:

$$PCR_{packets}=QUOT(PCR_{bits}, 1504) \qquad (4)$$

where PCR$_{packets}$ is the number of TS packets after which the PCR is sent along with the TS packet, QUOT (a, b) provides the quotient when 'a' is divided by 'b' and b is a number of bits in every TS packet.

Furthermore in this embodiment, a first PCR value that is to be sent along with the TS packet is computed as follows:

$$PCR_0=T_{init}$$

where T$_{init}$ is the value of STC when the TS packet containing the first PCR value is sent by the MPEG2 TS system 200 and PCR$_0$ is a value of PCR when the TS packet containing the first PCR value is sent by the MPEG2 TS system 200.

In addition in this embodiment, PCR to be sent along with an i$^{th}$ TS packet is computed using an equation:

$$PCR_i=PCR_{i-1}(num\_bits_i * PCR\_clock\_frequency/BR_{ts}) \qquad (5)$$

where PCR$_i$ is a value of i$^{th}$ PCR that is sent along with the i$^{th}$ TS packet, num_bits$_i$ is a number of TS bits sent after sending a last bit of PCR$_{i-1}$ till a first bit of PCR$_i$ and PCR_clock_frequency is 27 MHz.

Moreover in this embodiment, if a system clock frequency is not equal to 27 Mhz then the computed PCR may drift from the STC. The method of correcting the drift in the PCR is explained in more detail with reference to FIG. 6.

Also in operation, the TS manager 210 ensures that service information (SI) tables are sent along with the TS packets using the table creator 214. The table creator 214 provides a generic set of interfaces to the TS manager 210 to add the SI tables. The interfaces are independent of a SI table type and are extensible to support additional SI tables of different standards, such as digital video broadcasting (DVB), advanced television systems committee (ATSC) and the like by modifying the table creator 214.

Figure 3:
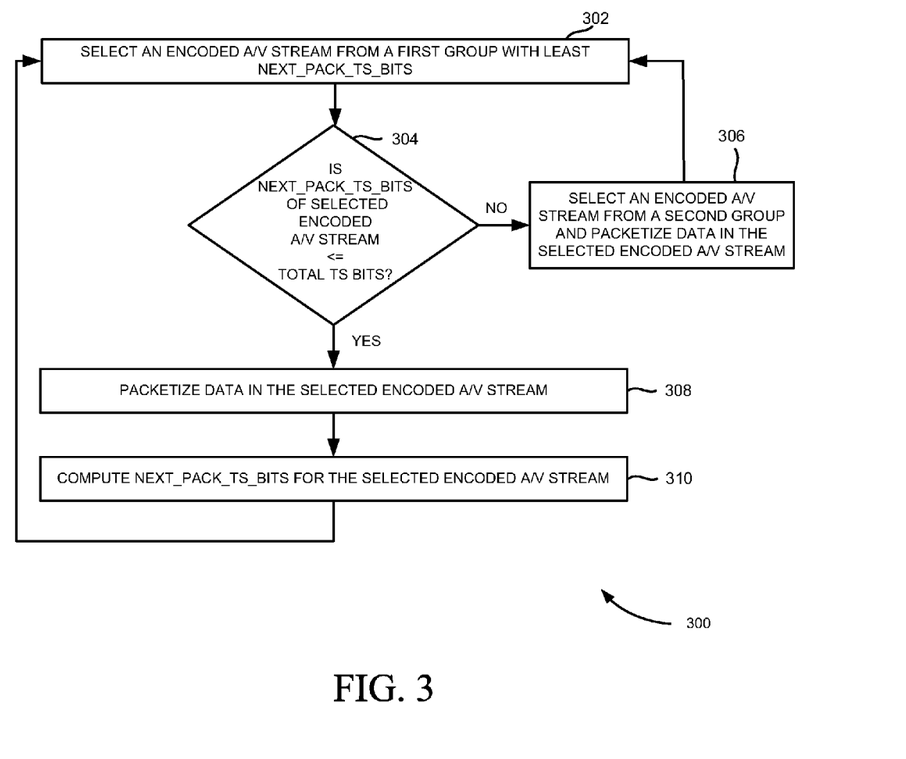
FIG. 3 is a flow chart of an exemplary method for selecting an encoded audio/video (A/V) stream from a first group.

Referring now to FIG. 3, which is a flow chart 300 of an exemplary method for selecting an encoded A/V stream from a first group. In one embodiment, the stream selector 208, shown in FIG. 2, maintains a number of bits after which data from the same encoded A/V stream can be packetized. The number of bits is referred to as next_pack_TS_bits. Initially, next_pack_TS_bits for all encoded A/V streams in the first group is set to zero. Further, an encoded A/V stream is selected randomly from the first group. Furthermore, data in the selected encoded A/V stream is packetized to generate a TS packet. In addition, the next_pack_TS_bits for the selected encoded A/V stream is computed using an equation:

$$next\_pack\_TS\_bits_i=next\_pack\_TS\_bits_i+interleaving\_bits_i \qquad (6)$$

where next_pack_TS_bits$_i$ is a value of next_pack_TS_bits of an i$^{th}$ encoded A/V stream and interleaving_bits$_i$ is a number of bits that have to be sent, from encoded A/V streams other than the i$^{th}$ encoded A/V stream, between two TS packets of the i$^{th}$ encoded A/V stream.

Moreover, the above steps of selecting an encoded A/V stream, packetizing data in the selected encoded A/V stream and computing next_pack_TS_bits for the selected encoded A/V stream are repeated for all the encoded A/V streams in the first group. Further, the encoded A/V streams in the first group are sorted in an increasing order of the next_pack_TS_bits. After the all the encoded A/V streams in the first group are sorted, at block 302, an encoded A/V stream with least next_pack_TS_bits is selected.

At block 304, it is determined whether the next_pack_TS_bits of the selected encoded A/V stream is less than or equal to total number of TS bits created at an instant of time (total TS bits). At block 306, an encoded A/V stream is selected from a second group and data in the selected encoded A/V stream is packetized if the next_pack_TS_bits is not less than or equal to the total TS bits. This is explained in more detail with reference to FIG. 4. Further, the process steps are repeated from the block 302. At block 308, data in the selected encoded A/V stream is packetized if the next_pack_TS_bits is less than or equal to the total TS bits. At block 310, next_pack_TS_bits is recomputed for the selected encoded A/V stream using the equation (6). Further, the process steps are repeated from the block 302.

Figure 4:
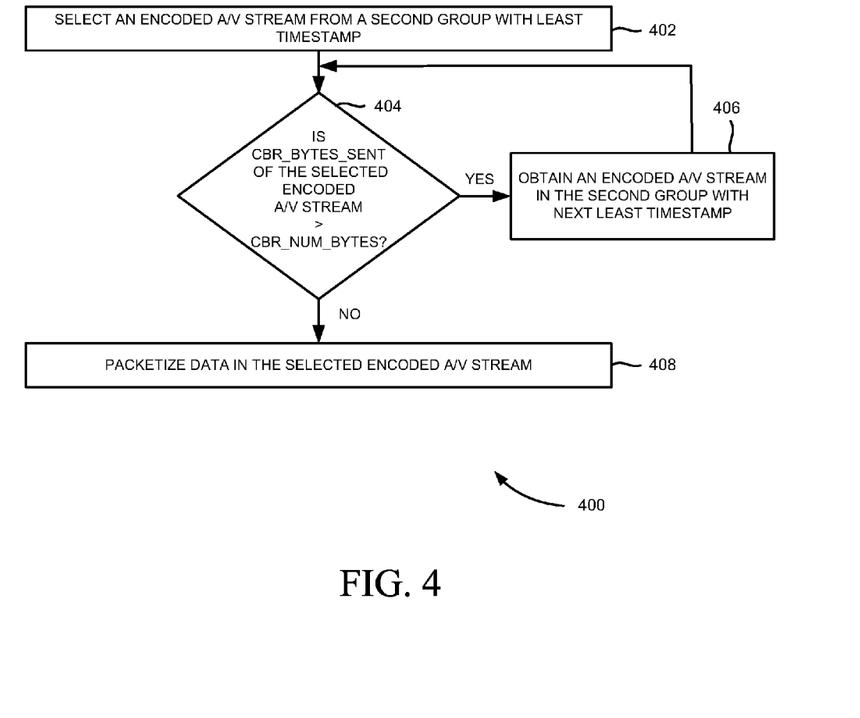
FIG. 4 is a flow chart of an exemplary method for selecting an encoded A/V stream from a second group.

Referring now to FIG. 4, which is a flow chart 400 of an exemplary method for selecting an encoded A/V stream from a second group. At block 402, an encoded A/V stream with least timestamp is selected from the second group. At block 404, it is determined whether a number of bytes sent from at an instant of time in a CBR interval (CBR_bytes_sent) from the selected encoded A/V stream is greater than the number of bytes that can be sent from the selected encoded A/V stream in the CBR interval (CBR_num_bytes). At block 406, an encoded A/V stream with next least time stamp in the second group is obtained if the CBR_bytes_sent is greater than the CBR_num_bytes. The process steps are then repeated from the block 404. At block 408, data in the selected encoded A/V stream is packetized if the CBR_bytes_sent is not greater than the CBR_num_bytes.

Figure 5:
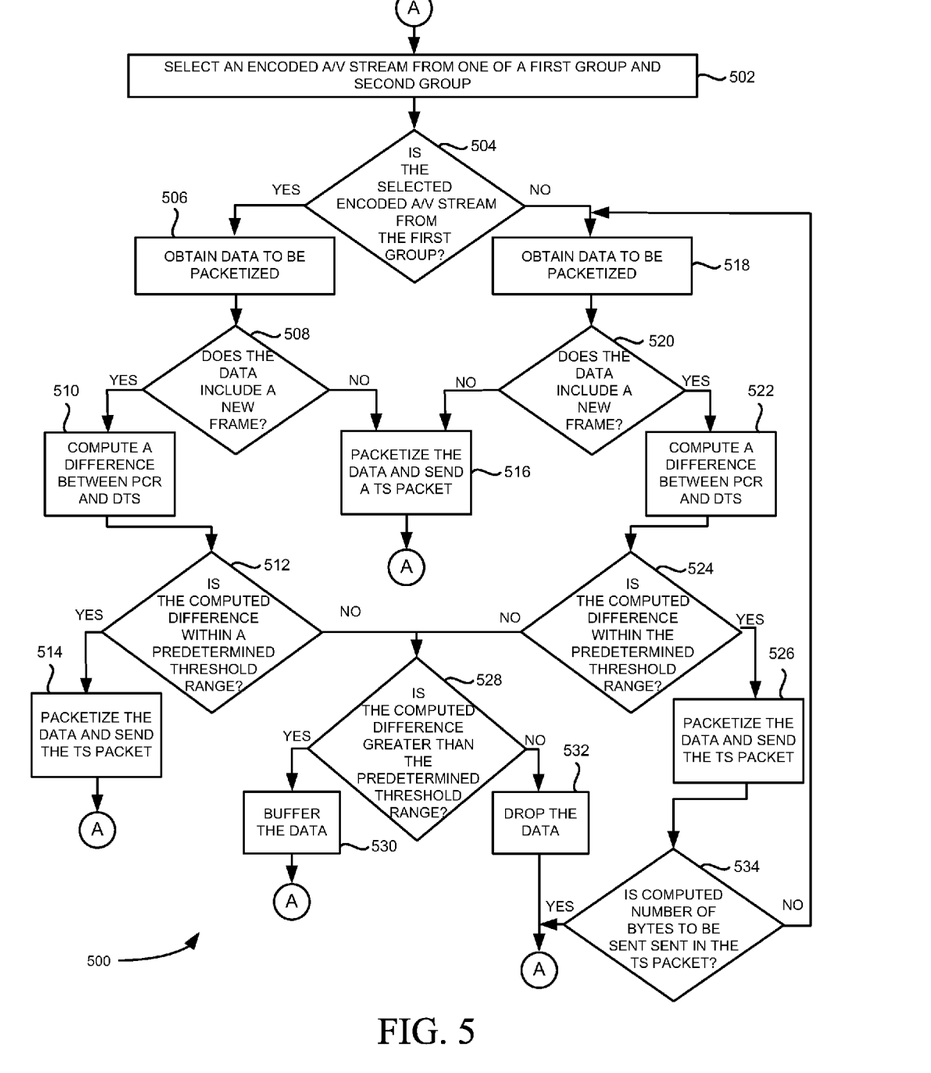
FIG. 5 is a flowchart of an exemplary method for generating TS packets.

Referring now to FIG. 5, which illustrates a flowchart 500 of an exemplary method for generating TS packets. At block 502, an encoded A/V stream is selected from one of a first group and second group. This is explained in more detail with reference to FIGS. 3 and 4. At block 504, it is determined whether the selected encoded A/V stream is from the first group. At block 506, data to be packetized is obtained from the selected encoded A/V stream if the selected encoded A/V stream is from the first group.

At block 508, it is determined whether the data includes a new frame. At block 516, the data is packetized and a TS packet is sent if the data does not include a new frame. In one embodiment, the TS packet is sent to the set-top boxes 222A-N. Further, the process steps are repeated from the block 502. At block 510, a difference between a PCR and a DTS associated with the new frame is computed if the data includes a new frame.

At block 512, it is determined whether the computed difference between the PCR and the DTS is within a predetermined threshold range. In one embodiment, the predetermined threshold range includes a maximum value of PCR and DTS difference and a minimum value of PCR and DTS difference. For example, the minimum value of PCR and DTS difference can be zero. The maximum value of PCR and DTS difference is computed based on a size of a plurality of main buffers 226A-N, shown in FIG. 2, using an equation:

$$\text{max\_PCR\_DTS\_diff} = \text{mb\_size}/\text{bit\_rate} \qquad (7)$$

where max_PCR_DTS_diff is the maximum value of PCR and DTS difference, mb_size is the size of the main buffers 226A-N and bit_rate is a bit rate of the selected encoded A/V stream, shown in FIG. 2.

At block 514, the data is packetized and the TS packet is sent if the computed difference between the PCR and DTS is within the predetermined threshold range. Further, the process steps are repeated from the block 502. If it is determined that the computed difference between the PCR and DTS is not within the predetermined threshold range then, at block 528, it is determined whether the computed difference between the PCR and DTS is greater than the predetermined threshold range. At block 532, the data is dropped if the computed difference between the PCR and DTS is not greater than the predetermined threshold range. Further, the process steps are repeated from the block 502. At block 530, the data is buffered if the computed difference between the PCR and DTS is greater than the predetermined threshold range. For example, the data is buffered until the difference between the PCR and DTS is within the predetermined threshold range and the stream selector does not select the buffered stream until the difference between PCR and DTS is within the predetermined threshold range. Further, the process steps are repeated from the block 502. At block 502, if the encoded A/V stream with the buffered data is selected, then the buffered data is packetized and the TS packet is sent.

Now, referring back to block 504, if the selected encoded A/V stream is not from the first group then, at block 518, data to be packetized is obtained from the selected encoded A/V stream. At block 520, it is determined whether the data includes a new frame. At block 516, the data is packetized and the TS packet is sent if the data does not include a new frame. Further, the process steps are repeated from the block 502. At block 522, a difference between a PCR and a DTS associated with the data is computed if the data includes a new frame.

At block 524, it is determined whether the computed difference between PCR and DTS is within a predetermined threshold range. If the computed difference between PCR and DTS is not within the predetermined threshold range then the process steps are repeated from the block 528. At block 526, the data is packetized and the TS packet is sent if the computed difference between the PCR and DTS is within the predetermined threshold range. At block 534, it is determined whether the TS packet sent completes computed number of bytes to be sent. This is explained in more detail with reference to FIG. 2. If the TS packet sent does not complete the computed number of bytes to be sent, then the process steps are repeated from the block 518. If the TS packet sent completes the computed number of bytes to be sent, then the process steps are repeated from the block 502.

Figure 6:
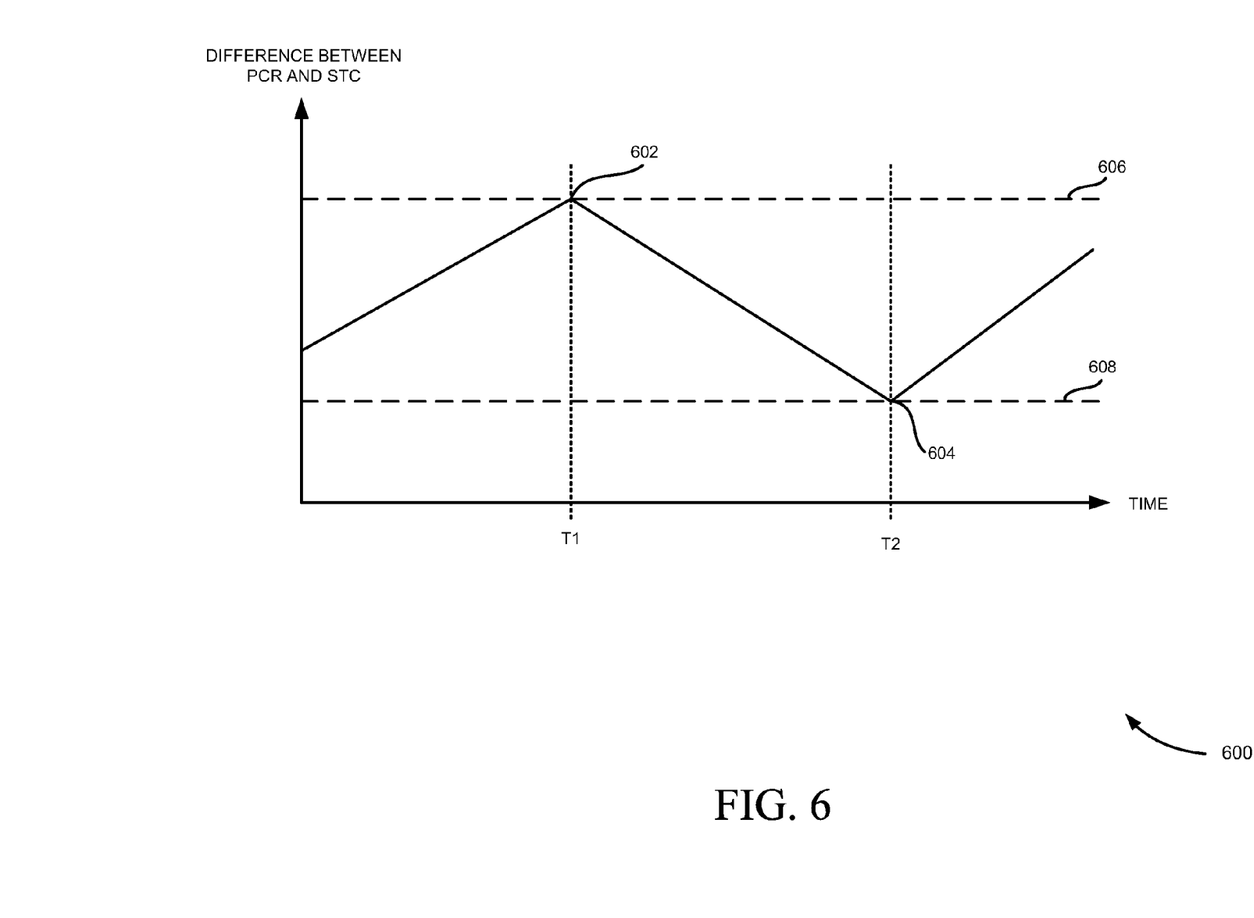
FIG. 6 is a timing diagram illustrating difference between program clock reference (PCR) and system time clock (STC) in the MPEG2 TS system, such as the one shown in FIG. 2, according to one embodiment.

In some embodiments, if data from an encoded A/V stream from neither the first group nor the second group is packetized then a NULL TS packet is sent Referring now to FIG. 6, which is a timing diagram 600 illustrating difference between a PCR and a STC in the MPEG2 TS system 200, such as the one shown in FIG. 2, according to one embodiment. As shown in FIG. 6, the timing diagram 600 is a graph of difference between PCR and STC and time. In the timing diagram 600, 606 indicates a maximum allowable difference between the PCR and STC and 608 indicates a minimum allowable difference between the PCR and STC. The range between the 606 and 608 indicates an allowable drift range.

In one embodiment, whenever a PCR has to be sent along with a TS packet the PCR is compared with the STC. If a drift between the PCR and STC is within the allowable drift range then the PCR is sent along with the TS packet. If the drift between the PCR and the STC is not within the allowable drift range then a correction factor is added to the PCR during PCR computation. In this embodiment, equation (5) used to compute PCR is modified to include the correction factor as:

$$PCR_i = PCR_{i-1} + ((\text{num\_bits}_i + \text{PCR\_drift\_adjust\_factor}) * \text{PCR\_clock\_frequency}/BR_{ts}) \qquad (6)$$

where PCR_drift_adjust_factor is the correction factor added to maintain the drift between the PCR and STC within the allowable drift range.

In an exemplary embodiment, initially, the PCR is incremented at a faster rate than the STC, as shown in FIG. 6. At time T1, the drift between the PCR and the STC is substantially equal to the maximum allowable difference between PCR and STC. Therefore, at 602, a rate at which PCR is incremented is reduced by adding a negative value of PCR_drift_adjust_factor in the equation (6). Further as shown in FIG. 6, the PCR is incremented at a slower rate than the STC. At time T2, the drift between the PCR and STC is substantially equal to the minimum allowable difference between PCR and STC. Therefore, at 604, the rate at which PCR is incremented is increased by adding a positive value of PCR_drift_adjust_factor in the equation (6). Furthermore, when the drift between the PCR and the STC is within the allowable drift range, PCR_drift_adjust_factor is zero.

Figure 7:
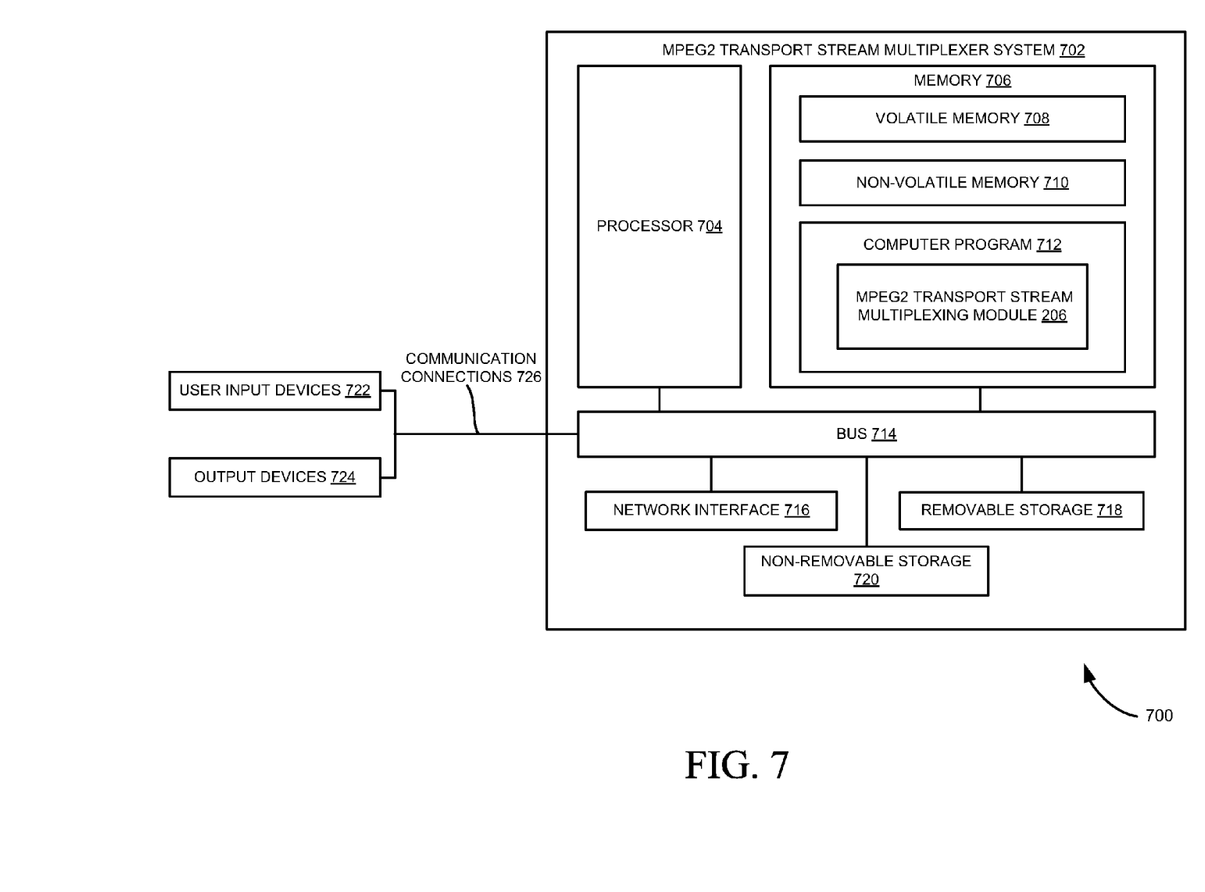
FIG. 7 illustrates a MPEG2 TS multiplexer (TSM) system including a MPEG2 TS multiplexing module to ensure buffer compliance in the MPEG2 TS system, using the process described with reference to FIG. 1, according to one embodiment.

Referring now to FIG. 7, which illustrates a MPEG2 TS multiplexer (TSM) system 702 including a MPEG2 TS multiplexing module 206 to ensure buffer compliance in the MPEG2 TS system 200, using the process shown in FIG. 1, according to one embodiment. FIG. 7 and the following discussions are intended to provide a brief, general description of a suitable computing environment in which certain embodiments of the inventive concepts contained herein are implemented.

The MPEG2 TSM system 702 includes a processor 704, memory 706, a removable storage 718, and a non-removable storage 720. The MPEG2 TSM system 702 additionally includes a bus 714 and a network interface 716. As shown in FIG. 7, the MPEG2 TSM system 702 includes access to the computing system environment 700 that includes one or more user input devices 722, one or more output devices 724, and one or more communication connections 726 such as a network interface card and/or a universal serial bus connection.

Exemplary user input devices 722 include a digitizer screen, a stylus, a trackball, a keyboard, a keypad, a mouse and the like. Exemplary output devices 724 include a display unit of the personal computer, a mobile device, the FMS, and the like. Exemplary communication connections 726 include a local area network, a wide area network, and/or other network.

The memory 706 further includes volatile memory 708 and non-volatile memory 710. A variety of computer-readable storage media are stored in and accessed from the memory elements of the MPEG2 TSM system 702, such as the volatile memory 708 and the non-volatile memory 710, the removable storage 718 and the non-removable storage 720. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 704, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 704 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 604 of the MPEG2 TSM system 702. For example, a computer program 712 includes machine-readable instructions capable of ensuring buffer compliance in the MPEG2 TSM system 702, according to the teachings and herein described embodiments of the present subject matter. In one embodiment, the computer program 712 is included on a compact disk-read only memory (CD-ROM) and loaded from the CD-ROM to a hard drive in the non-volatile memory 710. The machine-readable instructions cause the MPEG2 TSM system 702 to encode according to the various embodiments of the present subject matter.

As shown, the computer program 712 includes an MPEG2 TS multiplexing module 206. For example, the MPEG2 TS multiplexing module 206 can be in the form of instructions stored on a non-transitory computer-readable storage medium. The non-transitory computer-readable storage medium having the instructions that, when executed by the MPEG2 TSM system 702, causes the MPEG2 TSM system 702 to perform the one or more methods described in FIGS. 1 through 6.

In various embodiments, the method and system described in FIGS. 1 through 7 provide a software implementation of the MPEG2 TS multiplexing module. Further, the MPEG2 TS multiplexing module interleaves the encoded A/V streams using an unique algorithm to avoid an overflow condition of the transport buffers in the MPEG2 TS system. Furthermore, the MPEG2 TS multiplexing module packetizes data in one or more frames in the encoded A/V streams based on a PCR and DTS associated with the frames to avoid overflow and underflow conditions of main buffers in the MPEG2 TS system. In addition, the MPEG2 TS multiplexing module computes PCR based on the TS bit rate of the MPEG2 TS system and also automatically adjusts the computed PCR based on the STC.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of ensuring buffer compliance in a moving picture experts group 2 (MPEG2) transport stream (TS) system, comprising:
    categorizing a plurality of encoded audio/video (A/V) streams into a first group and a second group based on a TS bit rate of the MPEG2 TS system and a buffer drain rate of the plurality of encoded A/V streams;
    computing interleaving bits and a number of bytes to be sent for each encoded A/V stream in the first group and the second group, respectively;
    selecting an encoded A/V stream from one of the first group and second group based on the computed interleaving bits and number of bytes to he sent, respectively; and
    generating one or more TS packets by packetizing data in one or more frames in the selected encoded A/V stream based on program clock reference (PCR) and decode time stamp (DTS) associated with the one or more frames to ensure buffer compliance in the MPEG2 TS system, wherein generating the one or more TS packets comprises:

determining whether the selected encoded A/V stream is from the first group;
if so, generating a TS packet by packetizing data in the selected encoded A/V stream; and
if not, generating, the TS packet by packetizing data in the selected encoded A/V stream based on the computed number of bytes to be sent.

2. The method of claim 1, wherein the interleaving bits are computed for each encoded A/V stream in the first group based on a TS bit rate of the MPEG2 TS system and a bit rate associated with each encoded A/V stream in the first group.

3. The method of claim 1, wherein the number of bytes to he sent, in a predefined time interval, from each encoded A/V stream in the second group is computed based on a bit rate associated with each encoded A/V stream in the second group.

4. The method of claim 1, further comprising:
receiving the plurality of encoded A/V streams from a plurality of encoders in the MPEG2 TS system.

5. The method of claim 1, further comprising: recomputing the interleaving bits for the selected encoded A/V stream; and
repeating the step of selecting the encoded A/V stream from one of the first group and second group based on the recomputed interleaving bits and the computed number of bytes to be sent, respectively.

6. The method of claim 1, wherein generating the TS packet by packetizing the data in the selected encoded A/V stream comprises:
determining whether the data comprises a new frame;
if so, computing a PCR of the MPEG2 TS system;
comparing the PCR and a DTS associated with the new frame; and
generating the TS packet by packetizing the data based on the comparison.

7. The method of claim 6, further comprising:
if not, generating the TS packet b packetizing the data 8. The method of claim 6, wherein the PCR is computed based on a TS bit rate of the MPEG2 TS system.

9. The method of claim 6, further comprising:
comparing the computed PCR and a system time clock (STC); and
adding a correction factor to the PCR based on the comparison.

10. A moving picture experts group 2 (MPEG2) transport stream (IS) system, comprising;
a head end server, wherein the head end server comprise;
a MPEG2 TS multiplexing module, wherein the MPEG2 TS multiplexing module comprises;
a stream selector;
a TS manager coupled to the stream selector;
a program clock reference (PCR) generator coupled to the TS manager; and
a TS creator coupled to the PCR generator, wherein the stream selector categorizes a plurality of encoded audio/video (A/V) streams into a first group and a second group based on a TS bit rate of the MPEG2 TS system and a buffer drain rate of the plurality of encoded A/V streams, wherein the stream selector computes interleaving bits and a number of bytes to be sent for each encoded A/V stream in the first group and the second group, respectively, wherein the stream selector selects an encoded A/V stream from one of the first group and second group based on the computed interleaving bits and number of bytes to be sent, respectively, and wherein the TS creator generates one or more TS packets by packenzing data in one or more frames in the selected encoded A/V stream based on program clock reference (PCR) and decode time stamp (DTS) associated with the one or more frames to ensure buffer compliance in the MPEG2 TS system, wherein the TS creator is further configured to;
determine whether the selected encoded A/V stream is from the first group;
if so, generate a TS packet by packetizing data in the selected encoded A/V stream; and
if not, generate the TS packet by packetizing data in the selected encoded A/V stream based on the computed number of bytes to he sent.

11. The MPEG2 TS system of claim 10, wherein the stream selector computes the interleaving bits for each encoded A/V stream in the first group based on a TS bit rate of the MPEG2 TS system and a bit rate associated with each encoded A/V stream in the first group.

12. The MPEG2 TS system of claim 10, wherein the stream selector computes the number of bytes to be sent, in a predefined time interval, from each encoded A/V stream in the second group based on a bit rate associated with each encoded A/V stream in the second group.

13. The MPEG2 TS system of claim 10, wherein the headend server further comprises:
a system interface; and
a plurality of encoders coupled to the MPEG2 TS multiplexing module via the system interface, wherein the MPEG2 TS multiplexing module receives the plurality of encoded A/V streams from the plurality of encoders via the system interface.

14. The MPEG2 TS system of claim 10, wherein the stream selector is further configured to recompute the interleaving bits for the selected encoded A/V stream.

15. The MPEG2 TS system of claim 14, wherein the stream selector is further configured to repeat the step of selecting the encoded A/V stream from one of the first group and second group based on the recomputed interleaving bits and the computed number of bytes to be sent, respectively.

16. The MPEG2 TS system of claim 10, wherein the TS manager is configured to:
determine whether the data comprises a new frame;
if so, instruct the PCR generator to compute a PCR of the MPEG2 TS system;
instruct the TS creator to compare the PCR and a DTS associated with the new frame; and
instruct the TS creator to generate the TS packet by packetizing the data based on the comparison.

17. The MPEG2 TS system of claim 16, wherein the TS manager is further configured to;
if not, instruct the TS creator to generate the TS packet by packetizing the data.

18. The MPEG2 TS system of claim 16, wherein the PCR generator computes the PCR based on a TS bit rate of the MPEG2 TS system.

19. The MPEG2 TS system of claim 16, wherein the PCR generator is further configured to;
compare the computed PCR and a system time clock (STC); and
add a correction factor to the PCR based on the comparison.

20. At least one non-transitory computer-readable storage medium for ensuring buffer compliance in a moving picture experts group 2 (MPEG2) transport stream (TS) system having instructions that when executed by a computing device, cause the computing device to;

categorize a plurality of encoded audio/video (A/V) streams into a first group and a second group based on a TS bit rate of the MPEG2 TS system and a buffer drain rate of the plurality of encoded A/V streams;

compute interleaving bits and a number of bytes to be sent for each encoded A/V stream in the first group and the second group, respectively;

select an encoded A/V stream from one of the first group and second group based on the computed interleaving bits and number of bytes to be sent, respectively: and generate one or more TS packets by packetizing data in one or more frames in the selected encoded A/V stream based on program clock reference (PCR) and decode time stamp (DTS) associated with the one or more flames to ensure buffer compliance in the MPEG2 TS system, wherein generating the one or more TS packets comprises;

determining whether the selected encoded A/V stream is from the first group;

if so, generating a TS packet by packetizing data in the selected encoded A/V stream; and if not, generating the TS packet by packetizing data in the selected encoded A/V stream based on the computed number of bytes to be sent.

21. The at least o non-transitory computer-readable storage medium of claim 20, wherein the interleaving bits are computed for each encoded A/V stream in the first group based on a TS bit rate of the MPEG2 TS system and a bit rate associated with each encoded A/V stream in the first group, 22. The at least one ion-transitory computer-readable storage medium of claim 20, wherein the number of bytes to he sent, in a predefined time interval, from each encoded A/V stream in the second group is computed based on a hit rate associated with each encoded A/V stream in the second group.

23. The at least a non-transitory computer-readable storage medium of claim 20, further comprising;

receiving the plurality of encoded A/V streams from a plurality of encoders in the MPEG2 TS system.

24. The at least one non-transitory computer-readable storage medium of claim 20, further comprising: recomputing the interleaving bits for the selected encoded A/V stream; and repeating the step of selecting the encoded A/V stream from one of the first group and second group based on the recomputed interleaving bits and the number of bytes to be sent.

25. The at least one non-transitory computer-readable storage medium of claim 20, wherein generating the TS packet by packetizing the data in the selected encoded A/V stream comprises:

determining whether the data comprises a new frame;

if so, computing a PCR of the MPEG2 TS system;

comparing the PCR and a DTS associated with the new frame; and generating the TS packet by packetizing the data based on the comparison.

26. The at least one non-transitory computer-readable storage medium of claim 25, further comprising;

if not, generating the TS packet by packetizing the data.

27. The at least one non-transitory computer-readable storage medium of claim 25, wherein the PCR is computed based on a TS bit rate of the MPEG2 TS system.

28. The at least one non-transitory computer-readable storage medium of claim 25, further comprising:

comparing the computed PCR and a system time clock (STC); and adding a correction factor to the PCR based on the comparison.

29. The method of claim 1, wherein categorizing the plurality of encoded audio/video (A/V) streams into the first group and the second group comprises;

placing each encoded A/V stream with the buffer drain rate less than the TS bit rate of the MPEG2 TS system in the first group; and placing each encoded A/V stream with the buffer drain rate greater than or equal to the TS bit rate of the MPEG2 TS system in the second group.

30. The MPEG2 TS system of claim 10, wherein the stream selector is configured to:

place each encoded A/V stream with the buffer drain rate less than the TS bit rate of the MPEG2 TS system in the first group; and place each encoded A/V stream with the buffer drain rate greater than or equal to the TS bit rate of the MPEG2 TS system in the second group.

31. The at least one non-transitory computer-readable storage medium of claim 20, wherein categorizing the plurality of encoded audio/video (A/V) streams into the first group and the second group comprises;

placing each encoded A/V stream with the buffer chain rate less than the TS bit rate of the MPEG2 TS system in the first group; and placing each encoded A/V stream with the buffer drain rate greater than or equal to the TS bit rate of the MPEG2 TS system in the second group.

* * * * *